United States Patent [19]

Yasuda et al.

[11] Patent Number: 4,757,404
[45] Date of Patent: Jul. 12, 1988

[54] DOUBLE HEAD SUPPORTING MECHANISM FOR MAGNETIC DISK DRIVE

[75] Inventors: Yu Yasuda; Yushi Kawasaki; Kazuyuki Sunaga, all of Tokyo, Japan

[73] Assignee: Citizen Watch Co., Ltd., Tokyo, Japan

[21] Appl. No.: 909,821

[22] Filed: Sep. 19, 1986

[30] Foreign Application Priority Data

Sep. 21, 1985 [JP] Japan .................... 60-209637

[51] Int. Cl.⁴ .............. G11B 5/54; G11B 5/55; G11B 21/22; G11B 21/08
[52] U.S. Cl. .................... 360/105; 360/104; 360/106
[58] Field of Search ............ 360/105, 104, 106

[56] References Cited

U.S. PATENT DOCUMENTS

| | | | |
|---|---|---|---|
| 4,151,573 | 4/1979 | Tandon et al. | 360/105 |
| 4,306,260 | 12/1981 | Maeda et al. | 360/105 |
| 4,343,025 | 8/1982 | Kronfeld et al. | 360/104 |
| 4,355,339 | 10/1982 | King et al. | 360/105 |
| 4,658,315 | 4/1987 | Seki et al. | 360/104 |

FOREIGN PATENT DOCUMENTS 0012844 7/1980 European Pat. Off. .
0034245 8/1981 European Pat. Off. .

*Primary Examiner*—Robert S. Tupper
*Attorney, Agent, or Firm*—Koda and Androlia

[57] ABSTRACT

A double head supporting mechanism for a magnetic disk drive including an arm body and a carriage. The arm body includes an upper arm and a lower arm which are supported at their rear ends in a mutually rotatable manner. Both arms support an upper head and a lower head, respectively. Both of these heads hold a magnetic disk from both sides, at a mutually facing position, by having the magnetic disk inserted between them. The carriage is able to make reciprocal movement along the direction of the disk diameter. The arm body is held on its rear end side by the carriage in such a manner that it can swing freely by means of a common supporting spring. Both heads are constructed with a design so that they can follow the vertical deviation of the magnetic disk caused during rotation of the disk. The carriage is provided with a stopper to stop the lower arm from moving excessively. One of the heads is fixed to one of the arms, while the other head is held by the other arm through a gimbal spring in an inclinable manner. The common supporting spring is disposed along nearly the same plane as that of the magnetic disk.

5 Claims, 5 Drawing Sheets

DOUBLE HEAD SUPPORTING MECHANISM FOR MAGNETIC DISK DRIVE

BACKGROUND OF THE INVENTION

1. Field of the Invention

The present invention is related to a double head supporting mechanism for a magnetic disk drive, and particularly to a double head supporting mechanism for a magnetic disk drive with improved in performance to follow or track the upward and downward swell bias (deviation due to swaying in the vertical directions) caused during the rotation of magnetic disk drive, as well as in read/write quality.

2. Description of the Prior Art

As an external memory element of a computer, various types of magnetic disks are used, and they are in practical use in the form of a hard disk or a floppy disk.

In such disks, the necessary information is magnetically recorded on concentric circles along the surface of the magnetic disk. Also, random readout can be made freely from the magnetic disk. In order to enable such read/write performance, a magnetic disk drive is provided with a head supporting and feeding mechanism that serves to move and position the read/write head to and at the specified track along the rotating magnetic disk.

Usually, the above described hard disk is fixed in the body of the disk drive, in a sealed state and in a rotatable manner. On the other hand, the floppy disk is itself able to be inserted in and removed from the disk drive. However, for both cases, the read/write head must be supported on the disk surface securely, with a specified micro gap maintained in between or in a closely contacted manner. Accordingly, the head supporting mechanism as described above exerts a significant effect on the read/write characteristics.

Recently, the floppy disks in use have been reduced in size at a quick pace, from the conventional 8 inch type to the 5.25 inch or 3.5 inch type. As a result, their information recording density has increased markedly. Therefore, the proper positioning of the head when the foregoing disk surface and the head are in contact with each other is of vital importance.

Furthermore, the magnetic disk drive used presently is itself required to be small in size, and for a portable or transportable magnetic disk drive that is small in size and high in density, the role played by the head supporting mechanism has vital significance in maintaining constantly stable read/write characteristics.

Specifically, there has been the problem that, when a so called off-track in which the read/write head becomes positionally deviated in the direction of the magnetic disk diameter from the specified track is caused, sufficient reading output cannot be obtained thereby causing a read and write failure. The occurrence of such offtrack positioning not only depends on the bias caused during the assembly of the read/write head, but it also depends largely upon the pitch with which the head follows the swell bias (swaying deviation) in the upward and downward directions when it occurs during the rotation of the magnetic disk. Consequently, various types of head supporting mechanisms with a design to restrain the aforedescribed offtrack positioning incorporated in them have been provided.

The first of such systems offered conventionally is shown in U.S. Pat. No. 4,151,573 (Japanese patent Gazette No. 58-15866). The structure in this system is as follows. In order to hold the heads in close contact with both surfaces of the floppy disk, the lower head is unmovably fixed to the carriage, while the upper head is held against the arm by a gimbal support.

In this first conventional system, since the lower head is itself fixed to the carriage, its read/write surface provides the reference plane for reading from the floppy disk. Thus, the flexible floppy disk is forcibly caused to follow the lower head surface by the loading pressure given by the upper head, and in this manner, the swelling (waving) of the floppy disk is eliminated.

The second system proposed conventionally is to make the double-sided heads follow up and down the magnetic disk surfaces, respectively. For example, as proposed in the U.S. Pat. No. 4,355,339 (Japanese patent Gazette No. 56-98746), both heads are respectively held rotatably against the carriage, and in this way, each of the heads follows separately the vertical swelling of the magnetic disk.

The foregoing conventional systems, however, have been troubled with the problems described below. In the first system described above, because the lower head provides the fixed reference plane, the floppy disk is always forced to deform in order to follow the reference plane, with the specific drawback of a high degree of abrasion caused between the lower head and the disk surface. In addition, due to errors in manufacturing or assembly, the floppy disk carries with it a variance in height that is not negligible, when it is inserted into the drive. In the first system provided conventionally, the floppy disk having such vertical variance is made to follow the common, single reference plane. As a result, the extent of biting of the lower head into the disk face, that is usually known as penetration, differs for each floppy disk. Such forcible deformation caused to the disk not only invites the afore described abrasion, but also seriously and adversely affects the reading quality, and relatively extensive offtrack positioning is caused to each magnetic disk.

In the second system provided in the past, while the following or tracking performance of the magnetic disk is improved, because the rocking arms for fixing the respective heads are supported by the carriage separately to each other, the movements of the upper and lower arms when they follow the upward and downward swaying deviation of the magnetic disk are not uniform. As a result, variance is caused between the upper and lower heads in their offtrack positioning. Thus, it is difficult in practice to restrict the extent of the offtrack positioning of both of the heads within a preferred range.

SUMMARY OF THE INVENTION

The present invention, therefore, is intended to overcome the troubles suffered by the conventional systems described above, and the object of the present invention is to provide a double side supporting mechanism for limiting the offtrack positioning magnitude to a minimum, while letting heads on both sides to follow the upward and downward swaying deviation of the magnetic disk.

The foregoing object of the present invention is accomplished by providing a head supporting mechanism with the following structure. That is, the upper and lower heads which are to be disposed respectively on both sides of the magnetic disk in a manner to face each other, are held by the upper and lower arms, respectively. These both arms are supported at their rear ends in a mutually rotatable manner. In this way, an arm body is formed. Then, this arm body is held by the carriage in a rotatable manner, by means of a common spring for support.

With such structure provided, in the supporting mechanism according to the present invention, both heads are able to follow the vertical swaying deviation of the magnetic disk, as a single unit. The arm body as a single unit performs uniform movement relative to the upper and lower heads between the heads and the disk. As the result, the magnitudes of the offtrack positioning due to the rocking of the arm body becomes uniform for upper and lower heads. Therefore, unlike the conventional arms held separately, the offtrack positioning magnitudes on both sides can be contained easily within a specified value range.

As has been described above, according to this invention, since the arms themselves oscillate and follow the vertical rocking deviation of the disk, the head on one side can be fixed to the arm. Thereby making it possible to simplify the structure as well as the assembly of the structure. Also, different from the conventional mechanism, it does not provide a fixed reference plane for the vertical swelling deviation of the disk. Hence, for example, it does not cause the unnecessary penetration, thus eliminating the occurrence of undesirable problems, such as the abrasion of media and offtrack positioning due to the forcible deformation of the disk.

Furthermore, in the supporting mechanism provided by the present invention, the arm body is supported by the carriage by means of the single, common supporting spring. This makes it possible for the above described common supporting spring to be disposed on the same plane as that of the disk. As the result, the oscillation fulcrum of both head surfaces matches that of the disk, and because of it, the pitch (tilt) of the heads can be limited to a minimum.

DETAILED DESCRIPTION OF THE INVENTION

Hereunder, a detailed description of the preferred embodiment of the present invention will be given with reference to the drawings.

Figure 1:
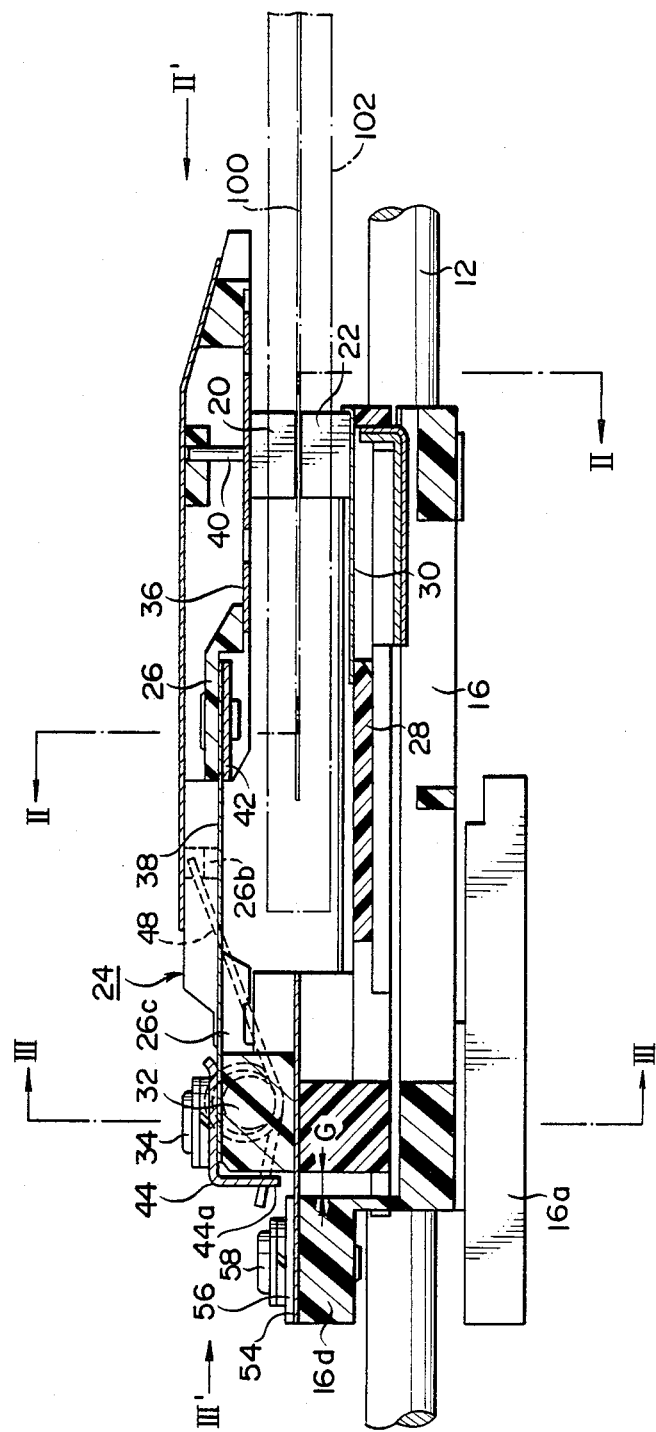
FIG. 1 is a sectional view showing a double (both-side) head supporting mechanism as a preferred embodiment of the present invention.
Figure 2:
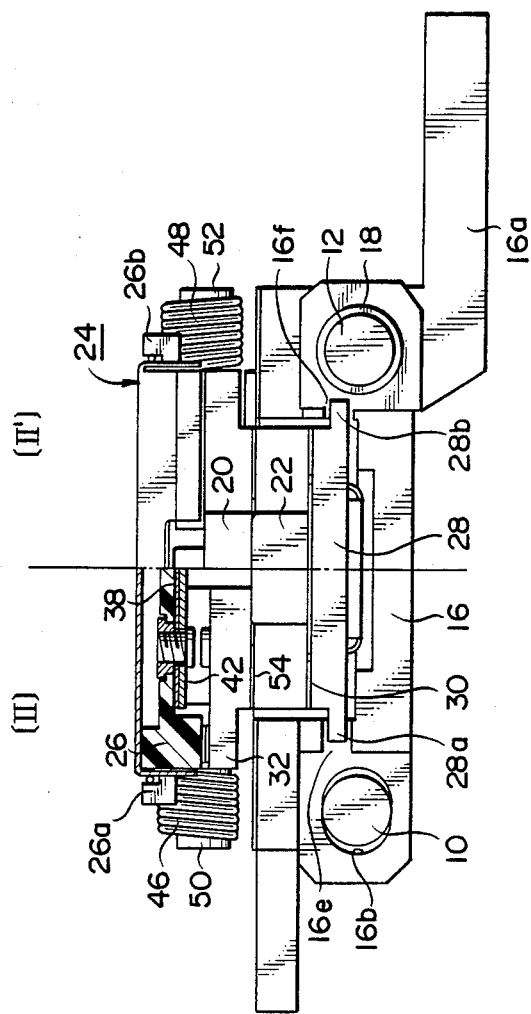
FIG. 2 shows a sectional view taken along the line II—II and a side view seen from the direction of II' in FIG. 1.
Figure 3:
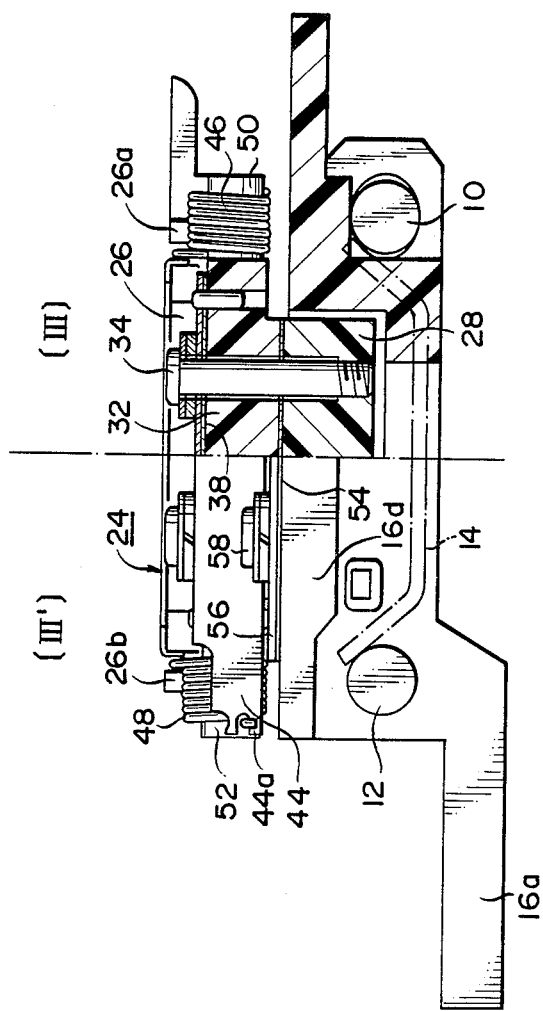
FIG. 3 shows a sectional view taken along the line III—III and a side view seen from the direction of III' in FIG. 1.

In FIGS. 1, 2 and 3, a preferred embodiment of the present invention is shown. In this embodiment, a dual head supporting mechanism desirable for the magnetic disk of a microfloppy disk (3.5 inch) performing the read and write operations is shown.

Although not shown in the drawings in detail, to a magnetic disk drive, two guide rails 10 and 12 are fixed by means of a rail presser (foot) 14. By these guide rails 10 and 12 a carriage 16 is supported in a manner movable back and forth. Into the mechanism, a floppy disk 100 indicated by the chain lines is inserted in a manner to be optionally inserted and taken out, and it is driven to rotate for reading/writing by a drive motor that is not shown in the drawings. The magnetic disk 100 in the figures can be formed of a 3.5 inch type floppy disk. This magnetic disk 100 itself is stored in a cartridge 102 made of plastic, etc.

The carriage 16 described above is driven by, for example, a stepping motor not shown in the figures, and it is positioned at a specified position, along the foregoing guide rails 10 and 12.

In order to effect the coupling with the above described stepping motor, the carriage 16 in the embodiment is provided with a projecting leg portion 16a, and as is known widely, it is coupled with the shaft of the stepping motor, by a belt, a belt, or feed screw, etc.

The carriage 16 has a bushing 18 in order to slide along the foregoing guide rail 12. The sliding of the carriage 16 against the guide rail on the other side is done through a long hole 16b. In this way, the reference position of the carriage 16 is set on the bushing 18 side, and the error in inter-shaft distance (wheel base) between the both guide rails 10 and 12 is absorbed by the foregoing long hole 16b.

On the rear end side of the carriage 16, an arm body supporting portion 16d for holding an arm body 24 that will be described later is disposed. For the whole body of the carriage 16, it is preferable that it is formed by injection molding of plastic material.

In this invention, in order to hold an upper head 20 and a lower head 22 on both sides of the magnetic disk 100, in a form that these upper and lower heads 20 and 22 are facing each other and in a state that they are in close contact with the magnetic disk 100, the arm body 24 is provided. This arm body 24 includes an upper arm 26 and a lower arm 28.

The lower arm 28 is shaped into a nearly flat plate form, and it is held between the both guide rails 10 and 12 in a manner that it is allowed to swing optionally against the carriage 16 as will be described later. To the front end of the lower arm 28, through a support plate 30, the previously described lower head 22 is fixed by bonding, etc.

Also, on the rear end side of the lower arm 28, a presser board 32 is fixed firmly by means of a screw 34, and by means of this presser board 32, the upper arm 26 and the lower arm 28 are held in a mutually rotatable manner.

In other words, on the front end side of the upper arm 26, through a gimbal spring 36, the upper head 20 is held, and by means of a rocking spring 38, the upper arm 26 itself is able to swing against the lower arm 28. To the center area of the gimbal spring 36, the upper head 20 is fixed firmly by adhesion, etc. The outer circumference of the gimbal spring 36 is fixed to the upper arm 26.

Furthermore, the end of a pivot 40 that is fixed to the upper arm 26 extends to nearly a center area of the gimbal spring 36. By this arrangement, the upper head 20 can tilt in any direction with the pivot 40 as the center. In this way, the upper head 20 is able to change its position (angle) by following the upper surface of the lower head 22 that is fixed to the lower arm 28.

In the embodiment, the above described rocking spring 38 is formed of a leaf spring, and its one end is fixed to the upper arm 26 with a screw by means of a presser plate 42, while its other end is fixed securely to the presser board 32 by a clamping force of the foregoing screw 34 and by means of a presser plate 44. Accordingly, it should be understood that it is possible for the upper arm 26 to swing relative to the lower arm 28, with the point at which the rear end portion 26c of the upper arm 26 comes into contact with the upper surface of the presser board 32 used as the fulcrum.

For the purpose of giving momentum to the upper arm 26 and lower arm 28 in the direction to bring both heads 20 and 22 into contact with the both sides of the disk 100 closely all the time, loading springs 46 and 48 are disposed between the both arms 26 and 28. These loading springs 46 and 48 are mounted over shafts 50 and 52 which are formed at both ends of and projecting from the presser board 32.

The respective one ends of the loading springs 46 and 48 are anchored to spring pegs 26a and 26b which are provided at the both ends of the arm 26, respectively. Also, the other ends of these loading springs 46, 48 are anchored to spring peg 44a formed in the presser plate 44. Therefore, in FIG. 1, the loading springs 46 and 48 bias both arms 26 and 28, in such way that the upper arm 26 is biased clockwise while the lower arm 28 is biased counterclockwise.

It should be understood from the description given above that the arm body 24 includes the upper arm 26 and the lower arm 28 which respectively support the upper head 20 and the lower head 22, and also it should be clear that, by means of the loading springs 46 and 48, both arms 26 and 28 are biased in directions to mutually approach.

What is characteristic in this invention is that the arm body 24 constructed as described above is held by the carriage 16 by means of a common supporting spring 54, in a manner that the whole of the arm body 24 is allowed to rock.

In this embodiment, the common supporting spring 54 is made of a leaf spring. On its one side, this common supporting spring 54 is inserted between the lower arm 28 and the presser board 32 and firmly fixed to the arm body 24 by the clamping force of the screw 34. The other end of the common supporting spring 54 is fixed securely to the arm body supporting portion 16d of the carriage 16 by a screw 58 through a presser plate 56. Consequently, the arm body 24 is supported by the carriage 16 by means of the common supporting spring 54, such that it can swing optionally. Thus, in the case when vertical swelling deviation occurs to the magnetic disk 100, it is possible for the arm body 24 to easily cause the both heads 20 and 22 to swing to follow the above described deviation.

In this embodiment, the gap G between the rear end portion of the arm body 24 and the front portion of the arm body supporting portion 16d of the carriage 16 is set to be extremely small, like 1 mm, for example. As the result, while the arm body 24 is supported by the common supporting spring 54, the arm body 24 does not move up and down due to the deformation of the spring 54, but it only makes the rocking movement by the deflection (bending) of the spring 54. Also, the arm body 24 is always able to return to the specified position. In addition, the gap G is extremely small as described above, and compared with this gap, the distance from the front end of the arm body supporting portion 16d of the carriage 16 to the both heads 20 and 22 is sufficiently long. Therefore, as will be described later, even with a modicum force created during the swelling deviation of the magnetic disk in upward and downward directions, both heads 20 and 22 are able to follow such deviation securely.

Also, in this embodiment, the above described common supporting spring 54 is disposed in the same plane as that of the magnetic disk 100, and as will be described later, the plane along which the both heads 20 and 22 come in contact with the magnetic disk 100 is the same as the plane in which the above described common supporting spring 54 is disposed. Consequently, during the rocking of the arm body 24 following the waving deviation of the magnetic disk 100 in the vertical direction, the magnitude of the offtrack caused by the tilting of the both heads 20 and 22 can be reduced (limited) substantially.

Furthermore, in this embodiment, in order to protect the arm body 24 against vibration from the outside or from impact to the carriage during transportation, and also to keep the lower arm 28 at the specified position when the upper arm 26 is sprung up against the loading spring 48 during the insertion or removal of the magnetic disk 100, a stopper mechanism is provided between the carriage 16 and the lower arm 28.

That is, as should be apparent from FIG. 2, on both sides of the lower arm 28, protruding portions 28a and 28b are formed. On the other hand, the carriage 16 is provided with stopper grooves 16e and 16f having a width sufficiently wider than the respective sizes of the foregoing protruding portions 28a and 28b. The upper side walls of the both grooves 16c and 16f serve to stop the lower arm 28 when the upper arm 26 is made to jump up. The lower side walls of the both grooves 16e and 16f serve to curb the downward movement of the lower arm 28.

Besides, in the foregoing embodiment, the common supporting spring 54 is fixed to the arm body 24, in a form that this common supporting spring 54 is held between the lower arm 28 and the presser board 32. It is also feasible to form the common supporting spring 54 as an integral part of the lower arm 28 by using the widely known insert molding process, at the time of the injection molding of the lower arm 28.

Likewise, the rocking spring 38 for enabling both arms 26 and 28 to swing can also be formed as a combined unit with the upper arm 26, by using the insert molding process, etc.

The embodiment according to the present invention is constructed as described above. Hereunder, the description on its operation will be given.

FIG. 1 shows the state wherein the inserting plane of the floppy disk 100 is at the imaginary (virtual) center position of the double-sided supporting mechanism, that is, the foregoing inserting plane shares the same plane as the above described common supporting spring 54.

However, due to a manufacturing error of the cartridge 102, etc., the plane of the floppy disk 100 is already deviated vertically when it is inserted to the supporting mechanism. Furthermore, during the rotation of the floppy disk 100, vertical swelling deviation that is not negligible is caused.

Figure 4:
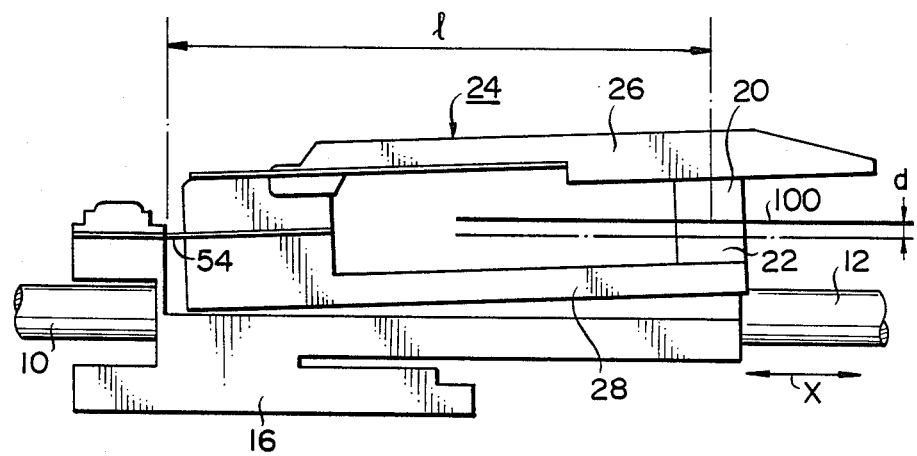
FIG. 4 is a schematic diagram showing the rocking state of the arm body of this embodiment.

FIG. 4 shows the state of following the upward and downward deviations, with the magnitude (extent) of the aforedescribed deviation indicated with d.

When such deviation d is caused, the arm body 24 according to the present invention swings as a whole by the deflection of the common supporting spring 54, while holding both heads 20 and 22 together. In the FIG. the arm body 24 swings upward.

As the result, as shown in FIG. 4, the arm body 24 can reliably follow the vertical deviation of the disk 100, and it is able to give the best appropriate loading pressure to the upper and lower heads 20 and 22, following the disk 100, without applying more than necessary stress to the disk 100 or without increasing the loading pressure to an excessive degree.

Furthermore, in this invention, the swinging motion of the arm body 24 as described above is made to draw an arc with the long radius 1 extending from the fulcrum of the carriage 16 to the center of the head. In this way, it becomes possible for the arm body 24 to accomplish the follow up without causing off-track positioning, that is, the displacement in the X-direction.

Also, according to the present invention, the arm body 24 is supported by a single common supporting spring 54, and this makes it possible to dispose the common supporting spring 54 on the same plane (level) as the plane of the magnetic disk 100. As the result, even when the heads on both sides are moved by following the upward and downward movement of the magnetic disk 100, the imbalance in offtrack positioning magnitude between both heads as well as the offtrack positioning magnitude itself can be limited to be extremely low.

Figure 5:
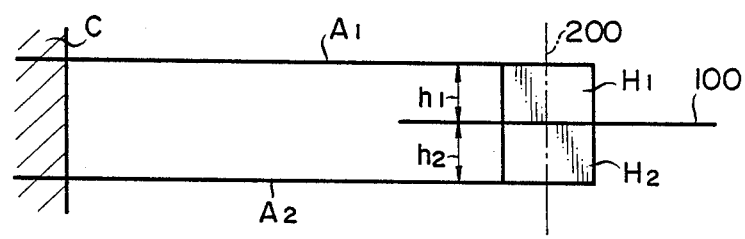
FIG. 5 and FIG. 6 are schematic diagrams showing the performance of an example of conventional mechanisms.

FIG. 5 shows the state in which the upper arm A1 and the lower arm A2 of the prior art are held by the carriage C separately in a rotatable manner, and the arms A1 and A2 hold the heads H1 and H2, respectively.

Figure 6:
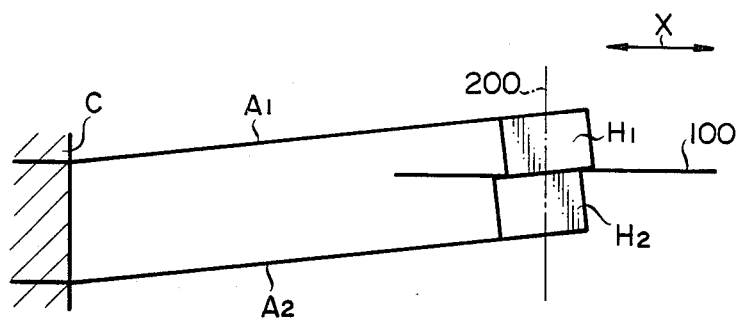

In this conventional system, for example, when the magnetic disk 100 is deviated upward in position as shown in FIG. 6, as is apparent from the Figure, the upper and lower heads H1 and H2 become deviated largely in the X-direction. Thus, the upper and lower heads H1 and H2 are moved significantly from the head center position 200 in FIG. 5, and offtrack positioning resulting from this deviation cannot be contained within the range that allows the read/write heads to work.

Such a defect in the conventional system is caused by the deviation of the position at which each of the arms A1 and A2 is fixed to the carriage C in the upward and downward directions. Due to the above, the respective heads H1 and H2 are tilted proportionally to the respective heights h1 and h2, and this in turn causes substantial offtrack positioning as shown in FIG. 6.

Figure 7:
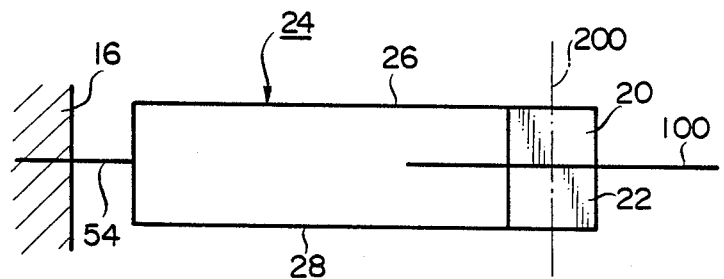
FIG. 7 and FIG. 8 are schematic diagrams showing the performance of the present invention corresponding to the conventional mechanism.
Figure 8:
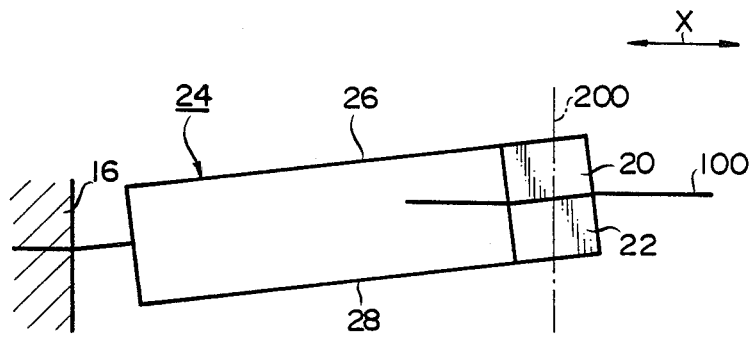

On the other hand, in FIG. 7 a schematic view of the head supporting mechanism provided by the present invention is shown. In this mechanism, even when the magnetic disk 100 moves upward as shown in FIG. 8, the magnitude of offtrack positioning caused by it can be restricted to be extremely low.

Furthermore, as shown in FIG. 7, the common supporting spring 54 is provided along the same plane (level) as that of the magnetic disk 100. As the result, in this invention, only the contact plane (surface) between the heads 20 and 22 and the magnetic disk 100 needs to be taken into consideration regardless of the height of these heads 20 and 22. Thus, unlike in the conventional system, the deviation due to the tilting of the heads does not affect the offtrack positioning at all. Consequently, as shown in FIG. 8, even when the magnetic disk 100 moves significantly in the upward direction, the contact plane between the heads 20 and 22 and the magnetic disk 100 almost no deviation in the X-direction. Thus, the desirable read/write operation can be performed without the offtrack positioning suffering.

The matching of the plane between the arm body supporting portion and the disk can be readily effected through the use of a single common supporting spring. The conventional system wherein the respective arms are fixed to the carriage separately is defective in obtaining the structure to achieve the matching between the above described supporting plane and the disk plane, and also it is disadvantageous in that it requires a complicated structure. In the present invention, such structural simplification can be accomplished satisfactorily.

The following should be apparent from the description given so far, that, according to the present invention, the double-sided head supporting mechanism with the improvements achieved as described below can be provided. That is, the dual head support-ing mechanism provided by this invention is simple in its structure. Also, in this mechanism, the heads themselves are made to follow the movement of the magnetic disk, and the heads are able to also follow the vertical swelling deviation of the magnetic disk reliably, thereby making it possible to satisfactorily perform the read/write operation. Furthermore, through the combination of the arm body with the common supporting spring, the offtrack positioning can be limited to be a minimum even during the previously described vertical movement.

We claim:

1. A double-head supporting mechanism for a magnetic disk drive comprising:
   an upper arm;
   a lower arm pivotally coupled to said upper arm at one end;
   upper and lower heads provided on another end of said upper and lower arms and facing each other and for holding a magnetic disk therebetween;
   a carriage that is reciprocally movable along a direction of a diameter of said magnetic disk; and
   a means for pivotally coupling both said upper and lower arms to said carriage at said one end including a common supporting spring;
   whereby upward and downward deviation caused during rotation of the magnetic disk can be followed by said upper and lower heads.

2. A double-head supporting mechanism for a magnetic disk drive as set forth in claim 1, wherein the carriage is provided with a stopper means for stopping the lower arm from pivoting towards said upper arm when pivotal movement of the upper and lower arms relative to the carriage exceeds a predetermined amount.

3. A double head supporting mechanism for a magnetic disk drive as set forth in either claim 1 or claim 2, wherein one of the heads is fixed to one of the arms, while the other head is held by the other arm by means of a gimbal spring whereby the other head is inclinable relative to said other arm.

4. A double head supporting mechanism for magnetic disk drive as set forth in claim 1 or claim 2, wherein the common supporting spring is disposed on almost the same plane as that of the magnetic disk.

5. A double head supporting mechanism for magnetic disk as forth in claim 3, wherein the common supporting spring is disposed on almost the same plane as that of the magnetic disk.

* * * * *